Sept. 4, 1923.
1,467,289
G. M. EAMES
METHOD OF FABRICATING TIRE FABRICS
Filed July 17, 1920
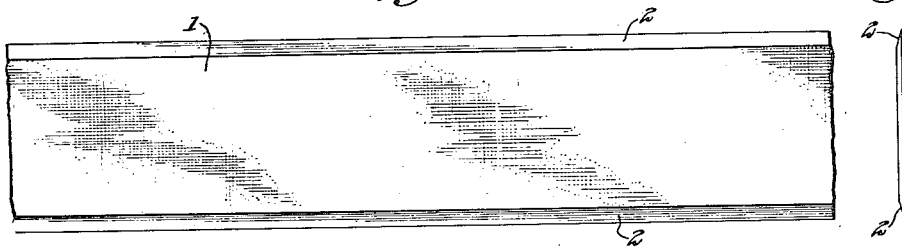
Fig. 1
Fig. 2
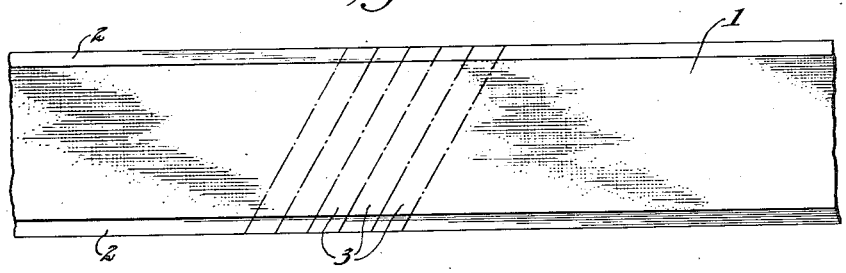
Fig. 3
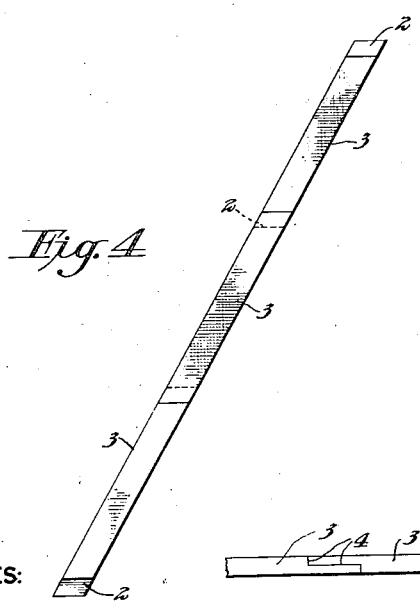
Fig. 4
Fig. 5
Fig. 6
WITNESSES:
Adrian DeMan.
W. May Duvall.
INVENTOR
George M. Eames.
BY
W. P. Stewart
ATTORNEY Patented Sept. 4, 1923.

1,467,289

UNITED STATES PATENT OFFICE.

GEORGE M. EAMES, OF BRIDGEPORT, CONNECTICUT.

METHOD OF FABRICATING TIRE FABRICS.

Application filed July 17, 1920. Serial No. 396,993.

*To all whom it may concern:*

Be it known that I, GEORGE M. EAMES, a citizen of the United States, residing at Bridgeport, in the county of Fairfield and State of Connecticut, have invented certain new and useful Improvements in Methods of Fabricating Tire Fabrics, of which the following is a specification.

This invention relates to an improvement in the method of fabricating tire-fabric which is employed in the manufacture of tires for the wheels of automobiles, &c.

It has been a common practice in tire manufacture to apply a thin sheet of adhesive material, usually a specially prepared rubber, to a rather wide sheet of canvas or duck material; cut the rubberized material into bias trips, and join the abutted ends of the bias-cut strip by zigzag stitching alternately anchored in the adjacent ends of the abutted strips. These joined strips are then employed in manufacturing the tire. This method of preparing the tire-fabric requires extreme care in stitching the bias-cut strips, while the joined strips present inherent defects in that the joining seams cause variations in the thickness of the finished strip, which uniformity of thickness is further destroyed occasionally by relative movement of the abutted edges of the individual strips.

It is the object of the present invention to, in a simple manner, obviate these defects in the prior methods of fabricating tire-fabric, by providing improved means of joining the individual strips whereby the joining of said strips does not produce any substantial variation in their thickness and whereby accidental relative movement of the ends of the joined strips is obviated.

In the accomplishing of the object of the present invention, the longitudinal margins of the sheet of canvas or duck material are uniformly beveled by scarfing, preferably before having the rubber applied thereto. The adhesive material may then be applied and the resulting product cut into strips in any approved manner. This provides strips having uniformly beveled ends. The individual strips are then successively joined by overlapping their beveled ends, the rubberized material causing the overlapped beveled ends to adhere with sufficient firmness to prevent relative movement thereof in the subsequent operation of manufacturing the tire, while the usual vulcanizing of the completed tire securely seals these joints. If desired, the adhesive material may be applied after the strips are cut from the canvas sheet.

In the accompanying drawings, Fig. 1 is a top plan view of a sheet of canvas or duck material having bevel-scarfed margins. Fig. 2 is an end view of the same. Fig. 3 is a view similar to Fig. 1 illustrating how the sheet is cut into bias strips. Fig. 4 is a top plan view of successively joined bias-cut strips. Fig. 5 is an end view of a portion of the joined strips shown in Fig. 4. Fig. 6 is a modification illustrating another form of scarf which may be employed instead of a beveled scarf.

Referring to the drawings and more particularly to Fig. 1, a sheet 1 of canvas, duck or other suitable material is scarfed along its longitudinal margins to provide uniformly beveled edges, as 2. This may be readily accomplished by running the sheet through any suitable skiving machine. The scarfed sheet 1 is preferably then rubberized in any approved manner and cut into bias strips 3 as particularly illustrated in Fig. 3. While it is preferred to apply the rubber to the canvas as a step succeeding the skiving operation, it is apparent that it may be applied before the skiving operation or to the individual bias-cut strips.

The bias-cut strips 3 are then joined as illustrated in Figs. 4 and 5 by overlapping the beveled ends 2, the adhesive nature of the rubber firmly holding the overlapped ends against accidental relative movement while the joined strip is embodied in the tire in the operation of manufacturing the same. The usual subsequent vulcanization of the completed tire securely seals the several strips together. Instead of scarfing the longitudinal margins to produce beveled edges 2, a right-angled scarf 4 may be employed as illustrated in Fig. 6. This modified form of scarf may also be readily obtained on a number of commercial skiving machines.

It is obvious that instead of depending upon the applied rubber to cause the overlapped beveled ends to adhere, some form of cement or the like may be employed, the particular feature of the present invention being the joining by adhesion of the scarfed ends of bias-cut strips into a strip of extended length and of substantially uniform thickness, which in the manufacture of the tire permits of the formation of a more symmetrical product and upon the vulcanization of the completed tire produces a more homogeneous article than was practicable heretofore.

Having thus set forth the nature of the invention, what I claim herein is—

An improvement in the method of fabricating a tire-fabric comprising joining a series of rubberized woven fabric strips cut from sheet-material, the joining of the strips being effected by overlapping rubberized strip ends scarfed by cutting away a portion of the material thereof to produce a juncture conforming substantially to the thickness and elasticity of the strips throughout.

In testimony whereof I affix my signature.

GEORGE M. EAMES.